United States Patent [19]

Tai

[11] 4,418,394

[45] Nov. 29, 1983

[54] OPTICAL RESIDUE ARITHMETIC COMPUTER HAVING PROGRAMMABLE COMPUTATION MODULE

[75] Inventor: Anthony M. Tai, Plymouth, Mich.

[73] Assignee: Environmental Research Institute of Michigan

[21] Appl. No.: 177,953

[22] Filed: Aug. 13, 1980

[51] Int. Cl.[3] .................. G06F 7/72

[52] U.S. Cl. .................. 364/746; 364/713

[58] Field of Search .................. 364/746, 713; 350/96.14

[56] References Cited

U.S. PATENT DOCUMENTS

| | | | |
|---|---|---|---|
| 3,980,874 | 9/1976 | Yora | 364/746 |
| 3,996,455 | 12/1976 | Schaefer et al. | 364/713 |
| 4,107,783 | 8/1978 | Huang | 364/746 |
| 4,281,391 | 7/1981 | Huang | 364/746 |

OTHER PUBLICATIONS

Psaltis & Casasent "Optical Residue Arithmetic: A Correlation Approach" *Applied Optics* vol. 18, No. 2, Jan. 15, 1979, pp. 163-171.

Tai et al "Optical Residue Arithmetic Computer with Programmable Computation Modules" *Applied Optics* vol. 18, No. 16, Aug. 15, 1979, pp. 2812-2823.

*Primary Examiner*—David H. Malzahn

*Attorney, Agent, or Firm*—Krass, Young & Schivley

[57] ABSTRACT

An optical computer based on the residue number system employs a plurality of computational modules which may be programmed using electronic pulses to perform addition, subtraction, multiplication and division operations. Each module comprises an array of optical switches in the form of directional wave guide couplers interconnected by optical transmission paths to form a series of maps corresponding to a given modulus. The optical switches are arranged in rows and groups of rows may be selectively activated to adapt the module to perform various arithmetic operations. One residue is input to the module in the form of light pulses and is spatially arranged to automatically select the proper map to perform a desired function. The optical switches in each row thereof are electrically interconnected to a bi-stable electrical switch that simultaneously switches all of the logical switches in that row in accordance with a programming input pulse delivered to one of the bi-stable switches. The light output from the last row of optical switches correspond to the function of two residues whose function has been computed and is delivered in spatially oriented form. The inputs of the electrical switches associated with one module may be connected with the light output of another module so as to permit various functions, such as polynomials, to be computed using chain processing techniques. Arrangements for encoding, decoding, and scaling are also disclosed.

23 Claims, 21 Drawing Figures

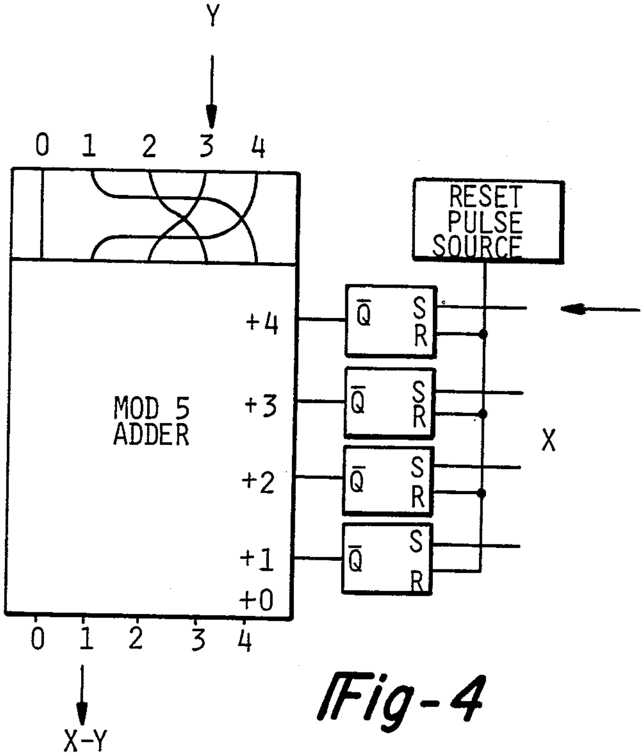
Fig-4
2K- LIKE
INVERSE TRANSFORM
| | | | | | |
|---|---|---|---|---|---|
| 2K | 0 | 1 | 2 | 3 | 4 |
| K | ? | 0 | 1 | 3 | 2 |
Fig-5
LOG 2K-
LIKE FORWARD
TRANSFORM
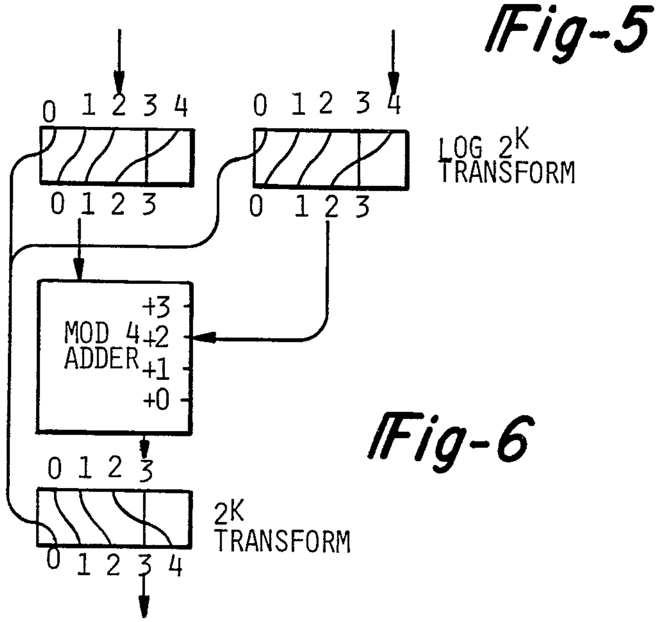
Fig-6

OPERATIONS PERFORMED IN MODULUS:

OPTICAL RESIDUE ARITHMETIC COMPUTER HAVING PROGRAMMABLE COMPUTATION MODULE

The Government has rights in this invention pursuant to Contract No. DASG60-78-C-0135 awarded by the Defense Logistics Agency.

TECHNICAL FIELD

The present invention generally relates to numerical computing systems, and deals more particularly with a computer having a plurality of optically based computational modules adapted to process data using the residue arithmetic system.

BACKGROUND ART

Residue arithmetic is one of the fastest numerical computing methods available due to its parallel arithmetic computational properties. Computation methods using residue arithmetic are particularly suited for implementation using optical processors arranged to operate on data using pipelining techniques. Optical numerical computers possess several advantages over electronic computers, including the inherent parallelism of optical systems, the possibility of wave length multiplexing, and the short propagation time of optical signals.

The residue number system is extremely well matched to optical computing systems due to the fact that no carry mechanism is needed in residue arithmetic. This allows all the computations to be performed in parallel, without the need for interconnection between the results of sub-calculations until the final decoding step, which returns the calculation results to a more conventional number system. Also, the residue number system decomposes a calculation into sub-calculations of smaller computational complexity. Once a calculation requiring a large dynamic range is decomposed into segments that can be handled directly by conventional analog methods, the full advantage of parallel processing using optical computer systems can be utilized to handle these segments.

Optical processors using special maps to perform residue arithmetic implemented by optical processors are known per se in the art. See, for example, "optical computation using residue arithmetic", by HUANG, et al, *Applied Optics*, Vol. 18, No. 2, Jan. 15, 1979. As mentioned previously, the main characteristic of the residue number system is that there are no carries, thus all of the columns of a calculation can be processed in parallel. The residue number system is based upon N fixed, prime integers $m_1, m_2, \ldots, m_N$, which are called moduli. For example, for a residue number system based on moduli 2, 3, 5 and 7, an integer number $X=14$ can be represented as $14=(R_1, R_2, R_3, R_4)=(0, 2, 4, 0)$, that is, a number represented by the series of integers which constitute the remainders, or residues when that number is divided by each of the chosen moduli of the residue number system.

In the performance of basic arithmetic operations, computations with respect to each of the residues may be carried out independently because of the absence of carry as noted above. For example, in the addition of two numbers in the residue number system, the two residues of each modules are added and the residue representation of the sum of the two numbers will simply be the ensemble of the sums of the individual residues. That is, if $(A_1, A_2, \ldots, A_N)$ and $(B_1, B_2, \ldots, B_N)$ are the residue representations of A and B, respectively, then $A+B=(A_1+B_1), (A_2+B_2), \ldots (A_N+B_N)$. Subtraction and multiplication operations are equally simple, while division is more difficult in the residue number system and generally involves several steps. Effort is usually made to structure algorithms so as to avoid the necessity for division.

Because the residues which collectively constitute a numerical representation in the residue number system may be processed separately to generate partial functions which collectively constitute the numerical representation of an arithmetic function of two input numerical representations, an arithmetic processor for residue numbers may be constructed from a plurality of modules, each of which operates on a single residue in the numerical representation of a number being arithmetically processed. Since the non-divisional processing of each residue only requires a single step, and no carries are involved, the entire arithmetic operation can be performed in a single step, with the output of each of the processor modules providing one residue representation of the output of the processor.

In residue arithmetic, the functions of varying numbers are cyclical. That is, the residue for a single modulus ranges between zero and that modulus. This feature allows the use of maps to generate the functions of a given arithmetic operation of a variable residue. The input to the map is a signal representative of a variable residue and the output signal is a representation of the function of the input and the given operation. For example, the truth table for $A+4=C$ modulo 5 is:

| A | C |
|---|---|
| 0 | 4 |
| 1 | 0 |
| 2 | 1 |
| 3 | 2 |
| 4 | 3 |

This can be implemented in the two dimensional map shown in FIG. 2. Electronic computers based on hardware or software maps of this type have required a look-up table or some form of external logic for the selection of the appropriate map. After the map is selected for the desired function, the map is then implemented optically, electro-optically or electronically.

The use of look-up tables or additional decision logic for the selection of the appropriate map substantially adds to total computational time. Optical implementation of the mapping concept mentioned above has the benefit of increasing computational speed, however, those prior art optical systems proposed for implementing the mapping technique lack flexibility and are rather complicated in their approach to selecting and programming the maps.

Accordingly, it is a primary object of the present invention to provide a computing system based on residue arithmetic which employs a plurality of optical computing modules to perform computations.

Another object of the present invention is to provide a computational module as described above which may be easily programmed to perform addition, subtraction, multiplication and division using electronic pulses.

A still further object of the invention is to provide a computing system of the type described above in which the computation modules may be interconnected to perform complex mathematical computation, coding, decoding, and scaling.

Another object of the invention is to provide a computing system as described above in which the computational modules are connected in chains to allow parallel, sequential computation operations to be performed.

These and further objects of the invention will become clear or will be made apparent during the course of the following description of a preferred embodiment of the present invention.

DISCLOSURE OF THE INVENTION

An optical computer comprises a plurality of interconnected computational modules which perform complex mathematical computations using the residue number system. Each computational module comprises an array of optical switches in a form of directional wave guide couplers interconnected by optical transmission paths to form a series of maps corresponding to a given modulus. The optical switches are arranged in groups of rows which may be selectively programmed to adapt the modules to perform addition, subtraction, multiplication, or division. Light pulse inputs to each module are spatially arranged such that a given residue input results in the automatic selection of the proper map, and the light pulse outputs from the last row of switches corresponds to the function of two residues which has been computed. The path of light pulses through the rows of optical switches is determined by a plurality of bi-stable electrical switches respectively associated with each row of optical switches and operable for simultaneously switching all of the optical switches in that row, thereby altering the path of light pulses as it passes through such row.

BRIEF DESCRIPTION OF THE DRAWINGS

In the drawings, wherein like components are designated by identical reference numerals in the various views:

FIG. 4 is a combined block and schematic diagram of a computation module similar to that shown in FIG. 3 but adapted for performing subtraction operations;

FIG. 5 is a transform table for the modulus 5;

FIG. 6 is a diagrammatic view showing how multiplication may be carried out for modulo 5 in accordance with the present invention;

BEST MODE FOR CARRYING OUT THE INVENTION

Before discussing the present invention in detail it will be helpful for purposes of later discussion to review several basic concepts related to the residue number system. The residue number system is based on N relatively prime integers $m_1, m_2 \ldots m_N$ called moduli. A number X can be represented in this residue number system as $r_{m1}, r_{m2}, \ldots r_{mN}$. The residue $r_{mi}$ can also be written as $|X|_{mi}$ and it is the remainder of the $X/m_i$ division operation. For example, with $X=24$ and $m_i=5$, the residue for modulus 5 would be $$r_5=|24|_5=4$$

The number of integers that can be represented uniquely by the residue number system is $$M = \prod_{i=1}^{N} m_i$$

The residue representation is cyclic over the range M. That is, the representations are the same for integers K, K+M, K+2M, etc. Ordinarily, only positive numbers are represented by the residue number system. However, negative numbers can also be represented by letting numbers 0 to $M/2-1$ represent positive integers and $M/2$ to $M-1$ represent negative integers such that $M/2\equiv-M/2$ and $M-1\equiv-1$.

Figure 1:
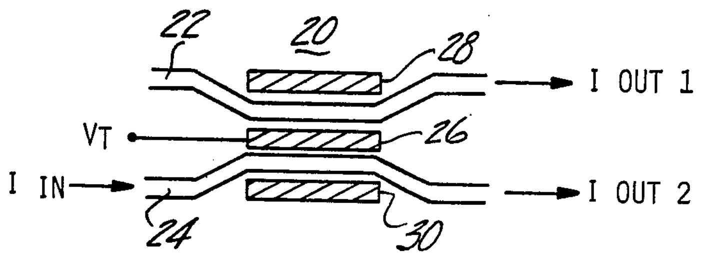
FIG. 1 is a diagrammatic view of an optical switch forming part of the computational module of the present invention.

Operations involving addition, subtraction, multiplication and division may be carried out in the residue number system as will be discussed in more detail later. In order to implement the electro-optical computer of the present invention, computation modules incorporating a plurality of directional coupler wave guide switches generally indicated by the numeral 20 in FIG. 1 are employed. As shown in FIG. 1, a pair of optical wave guides 22 and 24 are placed in physically proximate relationship to each other such that in the absence of an externally applied electric field, the wave guides 22 and 24 operate in synchronism with each other. In other words, a light wave entering one of the wave guides from the input thereof is coupled to the adjacent wave guide so as to produce a switch in the light path through the directional coupler. For example, light waves entering the input end of wave guide 24 are coupled to the wave guide 22 and exit from the coupler at the output end of wave guide 22 denoted as $I_{out\ 1}$. A primary electrode 26 coupled with a positive supply of voltage $V_T$ is interposed between the wave guides 22 and 24, while a pair of ground electrodes 28 and 30 are respectively disposed on opposite sides of the wave guides 22 and 24 whereby the latter are sandwiched between the primary electrode 26 and one of the ground electrodes 28 and 30. When voltage $V_T$ is applied to electrode 26, an electric field is created between electrode 26 and ground electrodes 28 and 30. Such an electric field interrupts the synchronism of the coupler 20 such that light entering the input in one of the wave guides 22 or 24 remains in that wave guide and is prevented from being coupled to the other wave guide. Thus, as shown in FIG. 1, in the absence of voltage being applied to electrode 26, light delivered to the input end of wave guide 24 exits from the directional coupler via the output end of wave guide 22; however, when voltage is applied to the electrode 26, light input to wave guide 24 remains in such wave guide and exits from the coupler 20 at the output end ($I_{out\ 2}$) of wave guide 24. For purposes of simplicity, the ground electrodes 28 and 30 will be deleted from the remaining discussion and the drawings.

Figure 2:
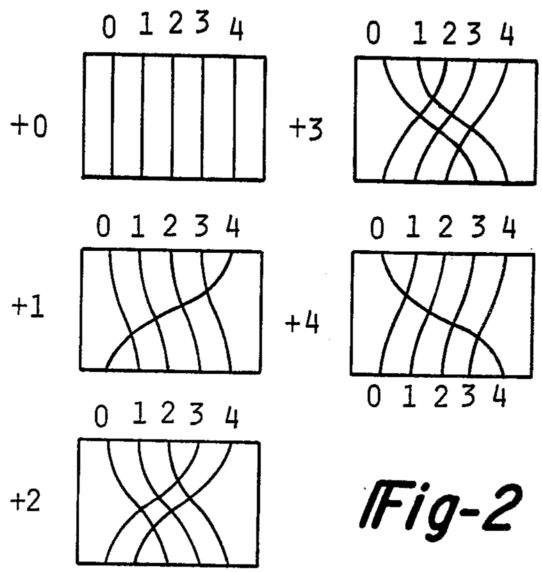
FIG. 2 is a series of map diagrams for modulo 5 employed to perform addition operations.
Figure 3:
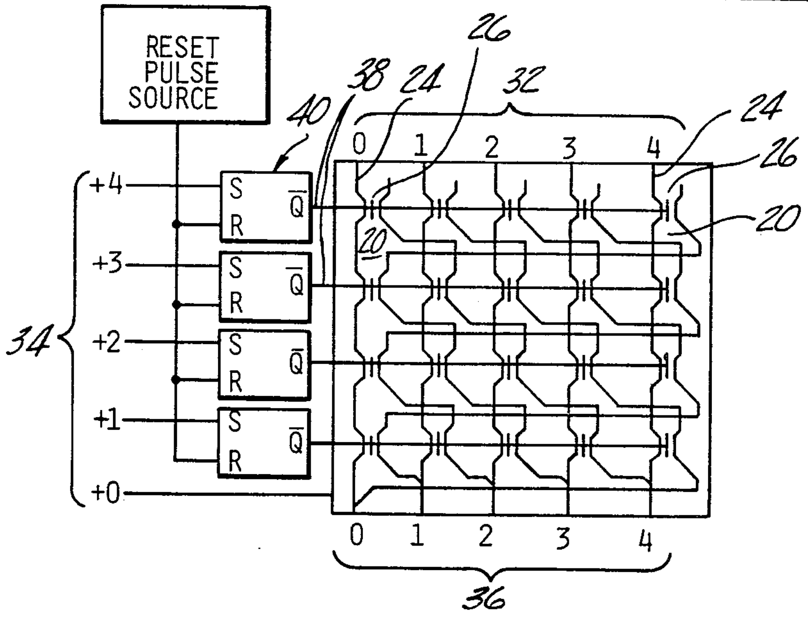
FIG. 3 is a combined block and schematic diagram of a computation module embodying the maps of FIG. 2.

The addition operation in the residue numbering system comprises essentially a shifting operation wherein an input light beam is shifted by K positions for the operation +K as is illustrated in FIG. 2 for the modulus 5. The diagrams of FIG. 2 spatially map the various possible residue inputs for modulus 5 so as to provide an output in spatially oriented form corresponding to a given addition operation. Similar maps may be devised for the operations of subtraction, multiplication and division. Previously, however, implementing such maps to perform arithmetic functions required a logic or look-up table in order to select the appropriate map. Using the directional coupler shown in FIG. 1, however, such map is inherently implemented in an electro-optical computation module, the heart of which comprises an adder whose details of construction are shown in FIG. 3 for the modulo 5. As shown in FIG. 3, the computation module includes a first set of 5 light inputs 32 numbered 0–4 and a second set of 5 electrical inputs 34, numbered +0— +4. Additionally, the module includes a set 36 of 5 light outputs indicated by the numeral 0–4 vertically aligned with the light inputs 32. The adder module shown in FIG. 3 comprises a plurality of aligned rows and columns of the directional couplers 20. One of the wave guides 24 of each of the directional couplers 20 and the upper row thereof define the light inputs 32, while the light outputs 36 comprise one or more combinations of the outputs of the directional couplers 20 in the bottom row thereof.

The directional couplers or light switches 20 in the various rows and columns thereof are interconnected with each other by means of optical transmission paths so as to incorporate each of the maps depicted in FIG. 2. The electrodes 26 of the directional couplers 20 of each row thereof are interconnected by an electrical line 38 which is in turn connected to the Q output of a bi-stable switching device such as the RS type flip-flops 40. The R inputs of flip-flops 40 are each connected to a reset pulse source, while the S inputs thereof define the electrical inputs 34. Normally, voltage is present on each of the lines 38 such that light delivered into each of the inputs 32 is output on the corresponding outputs 36; thus, light signals remain in the wave guide in which it originates during its passage through the module. In order to form the module for a +2 operation of example, a signal is applied to the +2 input 34 thereby actuating the set input of the corresponding flip-flop 40. This set input removes the voltage from the Q output, thereby removing voltage from each of the electrodes 26 of the directional couplers in the next to bottom row thereof. With the next to bottom row of couplers 20 having been thusly switched, light propagating through the module from the inputs 32 will have its source altered by the row of switched couplers in accordance with the mapped optical transmission paths so as to deliver such light signal on one of the light outputs 36 in accordance with the spatial input position wherein the light signal was input to the module along the inputs 32. It may therefore be appreciated that the computation adder module shown in FIG. 3 may be simply programmed by applying various combinations of input pulses to the electrical inputs 34 in order to select various premapped transmission paths which alter the optical path of light signals passing through the module in order to form the desired operation. It should be noted, at this point, that the initial voltage of each of the electrodes 26 could be set at zero and the interconnection of the wave guides 24 altered so that the module might then be programmed by selectively energizing the lines 38 to switch the couplers in a corresponding row. For convenience of explanation, however, those embodiments of the present invention discussed herein will each be assumed to operate with voltages normally being applied to the electrodes 26 with interruption of such voltage causing a switch in optical paths as discussed above.

Subtraction can be performed in connection with the present invention using the additive inverse $|-K|_{mi}$ of a residue number K which is defined such that $$|K+|-K|_{mi}|_{mi}=0$$

A fixed one-to-one correspondence exits between a residue number and its additive inverse. The additive inverse transformation can therefore be implemented by a fixed map, and by adding this transformation map to an adder computation module, such module can be such as shown in FIG. 4 for modulus 5.

Figure 7:
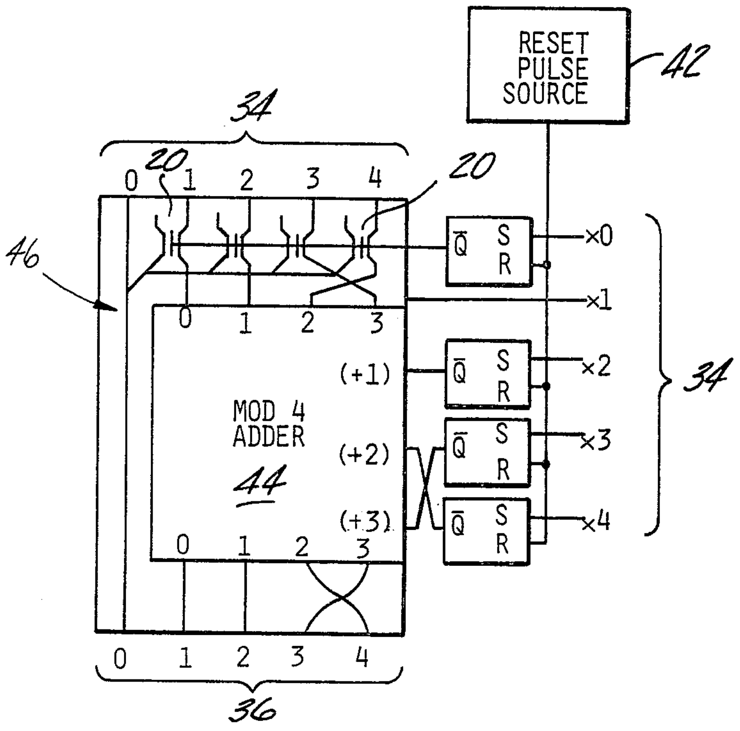
FIG. 7 is a combined block and schematic diagram of a computational module in accordance with the present invention suitable for carrying out multiplication operations using modulo 5.
Figure 8:
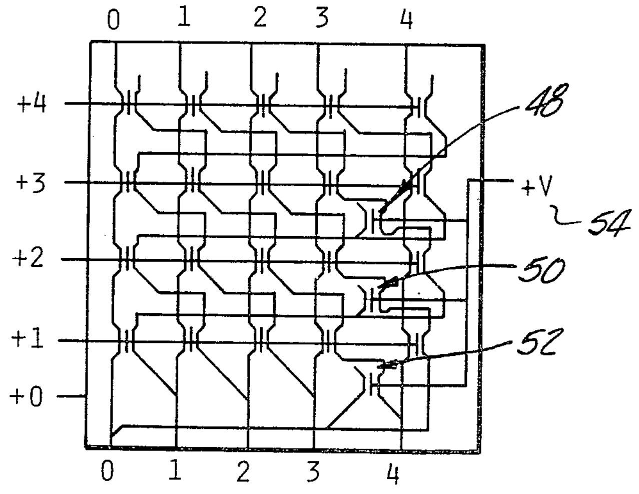
FIG. 8 is a schematic diagram of an addition module or modulo 5 suitable for conversion to modulo 4.

Multiplication can be implemented directly using the computational module of the present invention using $m_i$ maps for the operations of x0, x1, x2, . . . , $x(m_i-1)$. Alternatively, a homomorphic approach may be employed where a modulo $m_i$ multiplication is converted into a modulo $m_i-1$ additive operation. Using this latter approach a $\log_b K$-like forward transform is first performed on the operands. A modulo $m_i-1$ addition is then performed and the sum is inverse transformed by a $b^K$-like transform to obtain the product of the two original numbers. The transform table for modulus 5 is shown in FIG. 5, and the process is illustrated diagrammatically in FIG. 6. Although the $\log_b K$-like transformation for the value 0 is not defined, it is known that if either the multiplier or the multiplicand is 0, the product is 0. A modulo 5 multiplier is shown in FIG. 7 using this homomorphic approach in which a modulo 4 adder 44 is coupled with an additional row 46 of the coupler 20. In order to carry out modulo 5 multiplication, a modulo 4 addition is performed. Thus, in order to convert a modulo 5 adder into a modulo 5 multiplier, the modulo 5 adder is preferably designated in such a way that it can be easily converted into a modulo 4 adder. This can be achieved with the design shown in FIG. 8 in which additional couplers 48, 50 and 52 have been provided which are coupled with an independently controllable voltage source 54. It is to be noted that while the concept described above can be applied to an adder of any modulus, this homomorphic approach can be used only if the modulus is prime.

Figure 9:
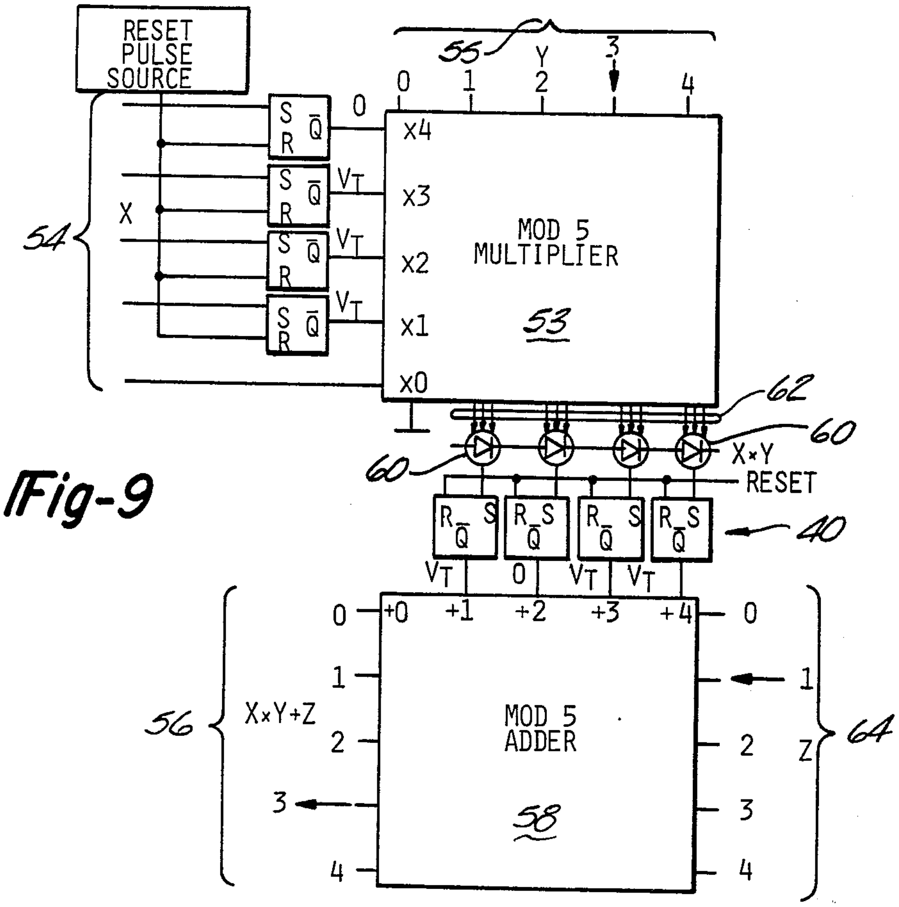
FIG. 9 is a combined schematic block diagram depicting multiplication and addition modules interconnected to compute functions of residues for modulo 5.

One feature of the module design described above is that the input, output and programming controls are all represented spatially in the same way. This allows the interconnection of the computational modules to perform sequential operations. The outputs of one module can be connected directly to the inputs of the next module or it can be used to program the map of the next adder module as illustrated in FIG. 9. An electrical pulse is sent to the first multiplier module 53 on one of the program control inputs 54 to program it to perform the operation $x|X|_{m_i}$ where $m_i$ is the modulus. A light pulse is then delivered into the light inputs 55 of the multiplier module 53 at the spatial position corresponding to $|Y|_{m_i}$. The exit position of the light beam from multiplier module 53 would correspond to $|X \times Y|_{m_i}$. A fast avalanche photo diode 60 is connected to each of the output wave guides 62 of multiplier module 53. The exiting light pulse will be detected by the corresponding photo diode 60 which generates an electrical output pulse. The electrical output pulse, in turn triggers the corresponding flip-flop 40 of the next adder module 58 thereby setting or "programming" it for the $+|X \times Y|_{m_i}$ operation. Another light pulse is then injected into the input 64 of the adder module 58 at the position corresponding to $|Z|_{m_i}$. The position where the light pulse exits at 56 from adder module 58 represents the sum of $|X \times Y + Z|_{m_i}$.

Figure 10:
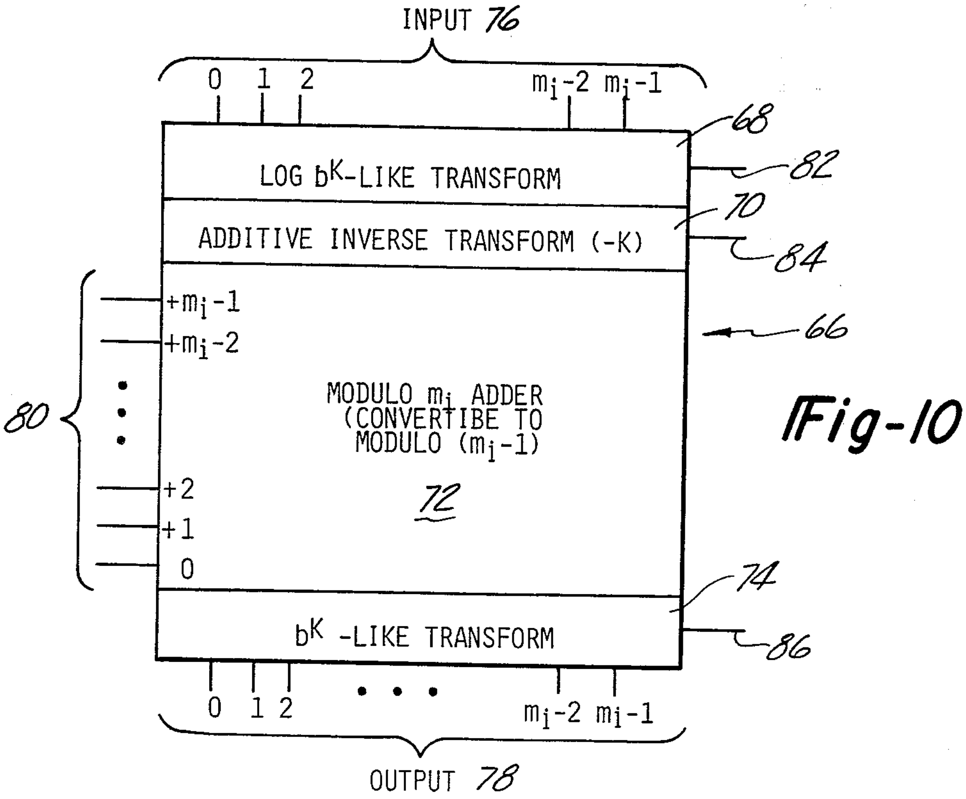
FIG. 10 is a diagrammatic view of a programmable multi-purpose computational module in accordance with the present invention.
Figure 12A:
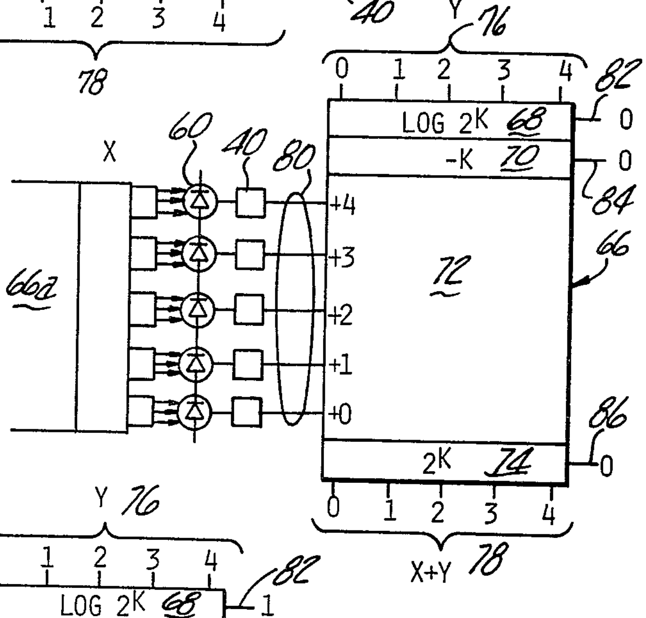
FIG. 12A is a block diagram view showing a pair of the modules of FIG. 11 interconnected to perform addition for modulo 5.

Attention is now directed to FIG. 10 wherein a multi-purpose, programmable computation module capable of forming addition, subtraction, multiplication and division operations is depicted. The multi-purpose programmable module 66 comprises 4 interconnected sections, namely, a $\log_b$K-like transform 68, an additive inverse transform (−K) 70, a modulo $m_i$ adder 72 and a $b^K$-like transform 74. The modulo $m_i$ adder 72 is adapted to perform modulo $m_i-1$ addition and the additive inverse transform (−K) section 70 is adapted to be converted into a $|-K|_{m_i-1}$ transform, when the module 66 is programmed to perform multiplication and division respectively. As in the case of modules previously described above, the multi-purpose programmable module 66 is provided with a plurality of light inputs 76, a plurality of light outputs 78, and a plurality of program control, electrical inputs 80 operably connected with the modulo $m_i$ adder section 72. Additionally, sections 68, 70 and 74 are further provided with corresponding electrical inputs 82, 84 and 86. The module 66 is simply programmed to perform the desired arithmetic operation by providing binary input signals on the inputs 80, 82, 84 and 86. For example, in order to program the module 66 to perform addition, appropriate signals are delivered to inputs 82, 84 and 86 in order to disable sections 68, 70 and 74, while appropriate signals are applied to inputs 80 in order to program the adder section 72. The programming of the modules 66 for performing the arithmetic operation X+Y is shown more particularly in FIG. 12A wherein the program control inputs 80 of a module 66 are operably coupled to the light outputs of another module 66A to receive values of X. The light input 76 of module 66 receive the values of Y. Lines 82, 84 and 86 are held low, and the function X+Y appears at the light output 78 of module 66. The arrangement shown in FIG. 12A may be readily adapted to perform the operation X−Y simply by delivering a high signal on line 84 thereby enabling section 70.

Figure 12B:
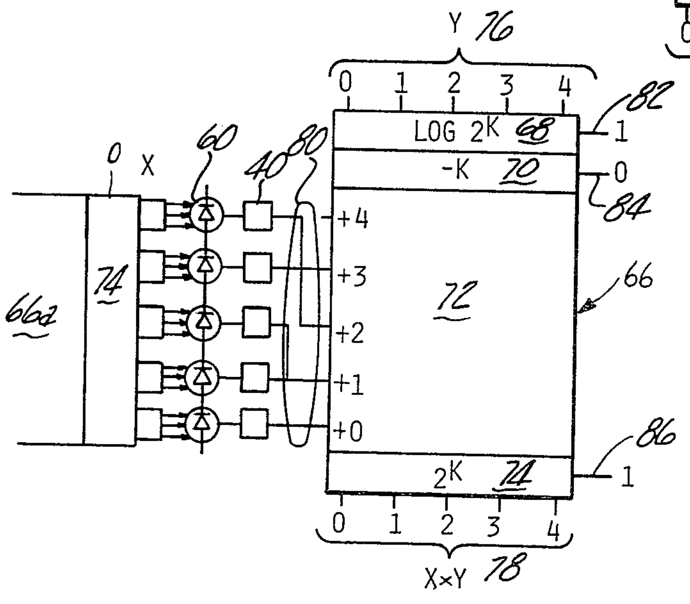
FIG. 12B is a view similar to FIG. 12A but showing one arrangement for interconnecting the module to perform multiplication operations.
Figure 12C:
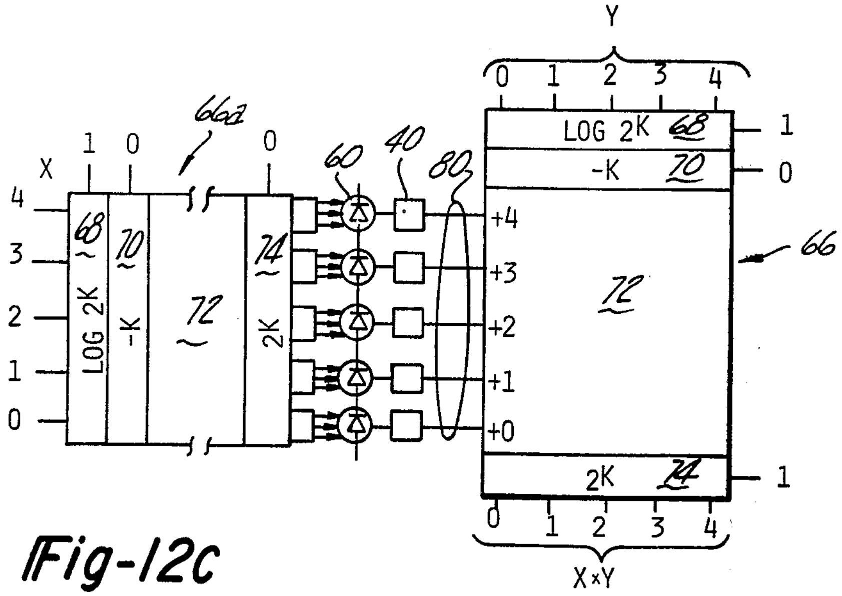
FIG. 12C is a view similar to FIG. 12B but showing alternate arrangement for interconnecting the modules to perform multiplication operations.

The computational modules 66 shown in FIG. 10 may be readily adapted to perform multiplication operations in either of two ways as indicated in FIGS. 12B and 12C. As shown in FIG. 12C, the light outputs of module 66A are connected to the corresponding programmable inputs 80 of module 66. Sections 70 and 74 of module 66A are held low and section 68 of module 66A is held high, while section 70 of module 66 is held low and sections 68 and 74 of module 66 are held high. While section 74 of module 66 shown in FIG. 12C is enabled to perform an inverse transform, both sections 74 of module 66 and 66A shown in 12B are enabled to perform inverse transforms on the multiplier (X) and multiplicand (Y). The approach depicted in FIG. 12C is advantageous in that the connection of the program control input leads 80 do not have to be altered, thus allowing the module 66 to be simply reprogrammed to perform addition when desired. Also, the arrangement shown in FIG. 12C provides additional flexibility with respect to performing division operations.

Figure 12D:
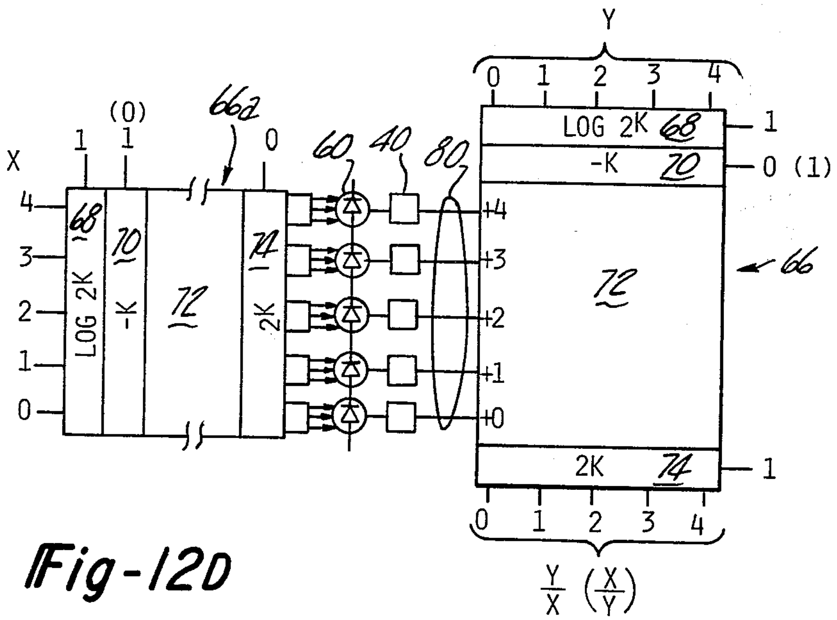
FIG. 12D is a view similar to FIG. 12C but showing the modules adapted for performing division operations.

The module 66 shown in FIG. 10 may be adapted to perform division operations as shown in FIG. 12D. Before discussing division operations, it is appropriate here to discuss generally division operations in the residue arithmetic system. Division can be performed using the same homomorphic approach, converting a modulo $m_i$ division into a modulo $m_i-1$ subtraction. However, this can be done only if the quotient is an integer (i.e., no remainder). There are several methods that can be employed for general division but each requires cumbersome sequential procedures. Moreover, these methods provide only a roundoff results since fractions cannot be represented in the residue number system. For this reason, residue arithmetic is generally applied to problems that do not require division operations such as matrix multiplication. Nevertheless it is often times useful to employ division operations where such operations are limited to the remainder zero case. One division operation involving the remainder zero case relates to scaling. In order to maintain the values within the range of the residue number system, it may be necessary to periodically scale the values down by a factor of K. Scaling can be achieved by division if K is a value of one of the moduli or the product of two or more moduli. As shown in FIG. 12D, module 66A is programmed by sections 68 and 70 which are enabled while section 74 is disabled. Thus, an additive inverse transform of the values of X is required for the division X after the $\log_2$K-like transform is performed. Sections 68 and 74 of module 66 are enabled while section 70 thereof is disabled. The resulting light output from module 66 corresponds to the operation Y divided by X. In order to perform the operation of X divided by Y, section 70 of module 66A is disabled while section 70 of module 66 is enabled.

Figure 11:
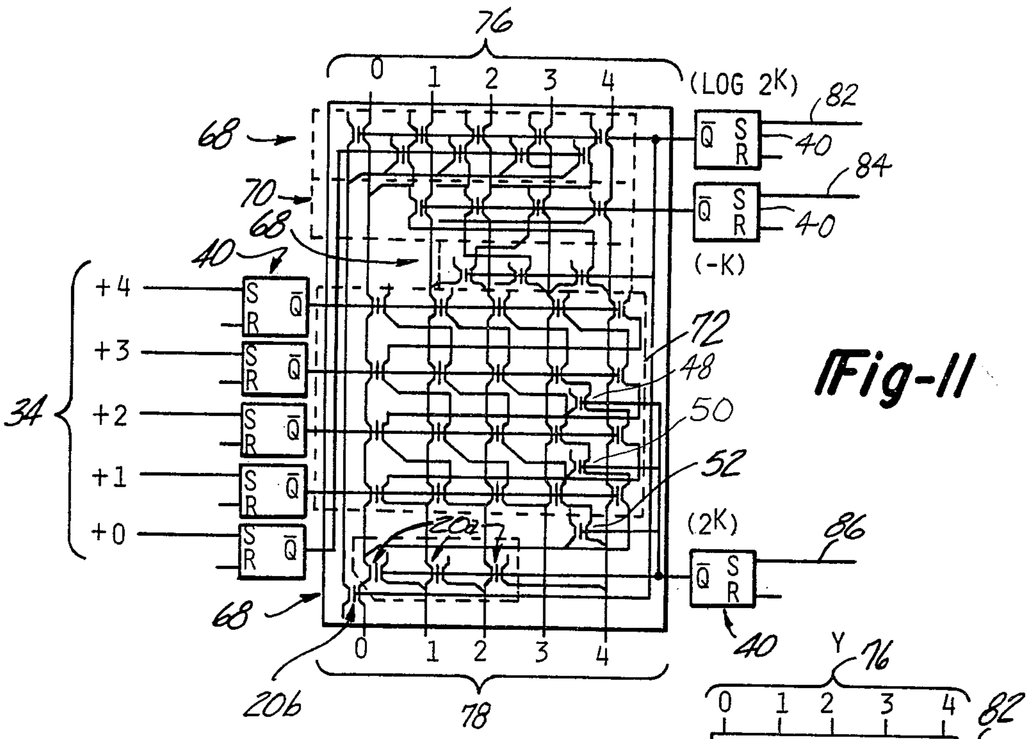
FIG. 11 is a detailed schematic view of the module shown in FIG. 10.

One suitable design for the module 66 shown in FIG. 10 is depicted in detail in FIG. 11 for the modulo 5. As shown in FIG. 11, each of the inputs 34, 82, 84 and 86 form the set inputs of respectively associated flip-flops 40. Section 68 includes one row of the couplers 20, the second row thereof being controlled by the 0 control input 34. The third row of directional couplers 20 form the additive inverse transform section 70 and are under control of line 84. The fourth row of directional couplers 20 also form a part of section 68 and are under control of line 82. Essentially, rows five through eight of directional couplers 20 form the adder section 72, and section 74 comprises directional couplers 48, 50, 52 and 20*a* which are controlled by line 86. A directional coupler 20*b* in the lower left-hand corner of module 66 also forms a part of section 68 and is under control of line 82. When performing an addition operation, a light pulse injected into any of the inputs 76 propagates undeviated along the same input wave guide through the upper four rows of directional couplers 4 since lines 82 and 84 are held low. Likewise, since line 86 is low, section 74 is off and the light outputs of the adder portion of module 66 propagate undeviated to the light output 78. During subtraction operations, with section 70 turned on, the path of light pulses propagating through the module 66 deviate in accordance with the transform map shown in FIG. 6. It is to be noted that, while operating in the addition and subtraction modes, with section 68 disabled, an input on the 0 input control line 80 has no effect on the path taken by light through the module. Thus, the position of the exit light beam would be the same as that of the input light beam for a +0 operation. The additional coupler 20*b* is provided only when it is desired to interconnect the modules in a manner depicted in FIG. 12C. Coupler 20 is activated along with section 68, as mentioned previously. When the value of the multiplier X is 0, the 0 input control 80 of module 66 shown in FIG. 12C is turned on and the multiplication sign 0 operation is then performed. If the multiplier is 1, its $\log_2 K$-like transform is 0; the purpose of the extra coupler 20*b* is to maintain the transformed 0 output of the multiplier from setting the 0 control input 34 of module 66.

Figure 13:
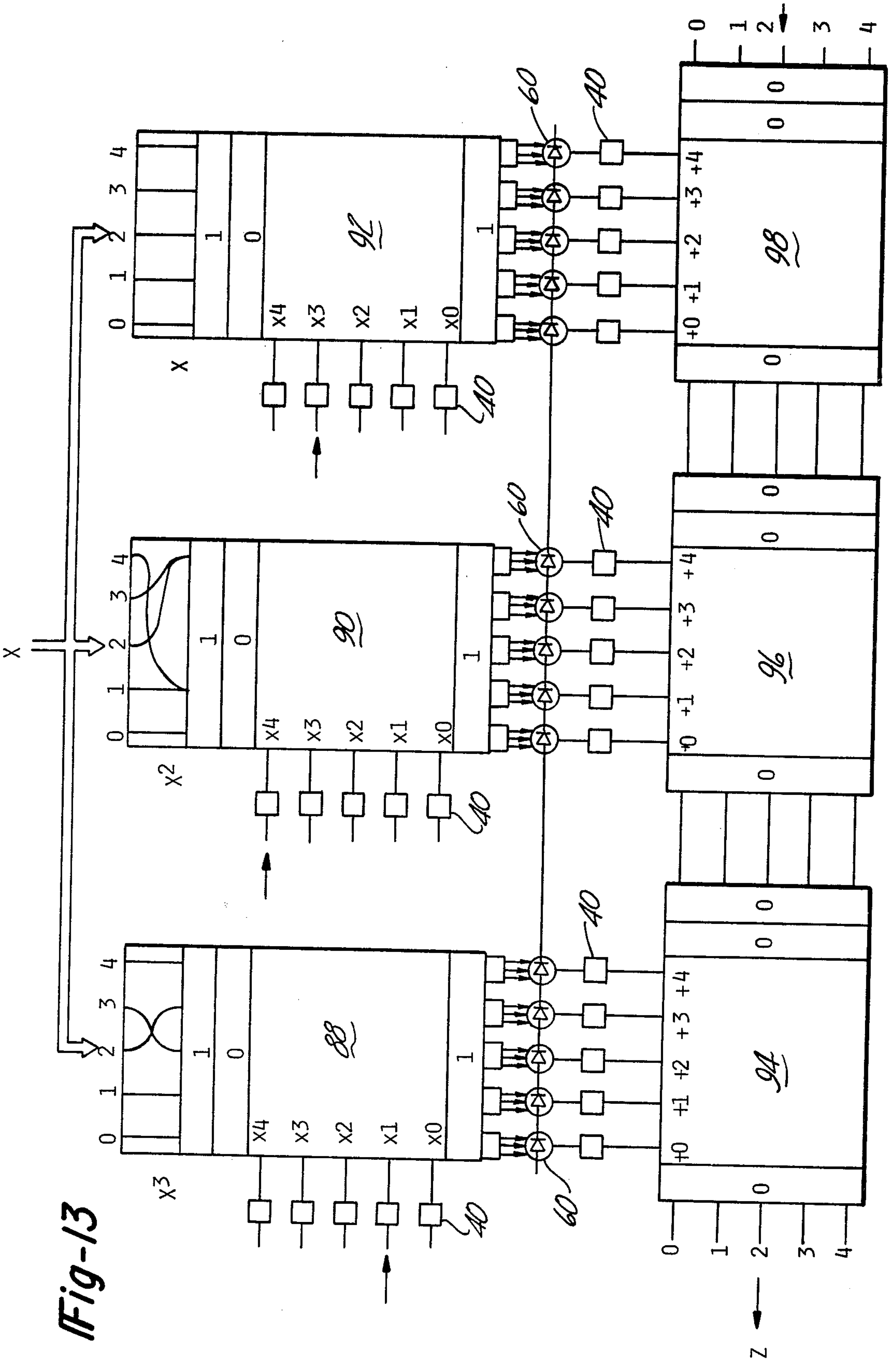
FIG. 13 is a block diagram showing a plurality of the modules of FIG. 10 interconnected to evaluate the polynomial $X^3+4X^2+3X+2$.

As an example of how the computation modules of the present invention can be interconnected to perform various mathematical calculations, reference is now made to FIG. 13 wherein an interconnected arrangement of the modules for modulo 5 are interconnected in a manner to compute $X^3+4X^2+3X+2$. As shown in FIG. 13, three computation modules 88, 90 and 92, similar to that depicted in FIGS. 10 and 11, have their light outputs operably connected with the program control inputs of three additional computational modules 94, 96 and 98. Modules 88–92 are programmed to perform multiplication operations while modules 94–98 are programmed to perform addition. The coefficients of X, i.e., 1, 4 and 3 are entered into the respective program control inputs of modules 88–92 while the values of X are input to the light inputs of modules 88–92. The output from module 88 corresponds to $X^3$, while the outputs of modules 90 and 92 respectively correspond to the $4X^2$ and 3X values. Thus, adder module 94 has the control inputs thereof set by the $X^3$ output of module 88, adder module 96 has the program control inputs thereof set by the $4X^2$ output of module 90, and the program control inputs of adder module 98 are set by the value of 3X output from module 92. Next, the +2 value of the equation to be computed is input on the number 2 light input of adder module 98. Modules 94, 96 and 98 then proceed to add the values of $X^3$ to $4X^2$, 3X and 2 in order to complete the computation.

The computation time required to compute a value of the desired polynomial is equal to the period needed to program the program control inputs of adder modules 94–98 in addition to the propagation time through four of the modules. The propagation time through a single module of approximately one-half inch in length is approximately forty pico-seconds. The time required to program each of the addition modules 94–98 is equal to the sum of the detection delay of the photo diodes 60, the switching delay of the flip-flops 40 and the switching time of the wave guide couplers 20. It is thus possible to achieve a set or programming time of two nano-seconds for the computational modules. Assuming that an additional one nano-second is required for a light pulse to pass through the module and to reset the flip-flops, the throughput rate is about one calculation every 3 nano-seconds or about 333 MHz. Due to the fact that the modules are interconnected in parallel with each other, the computational time is approximately equal for polynomials of any order.

Figure 14A:
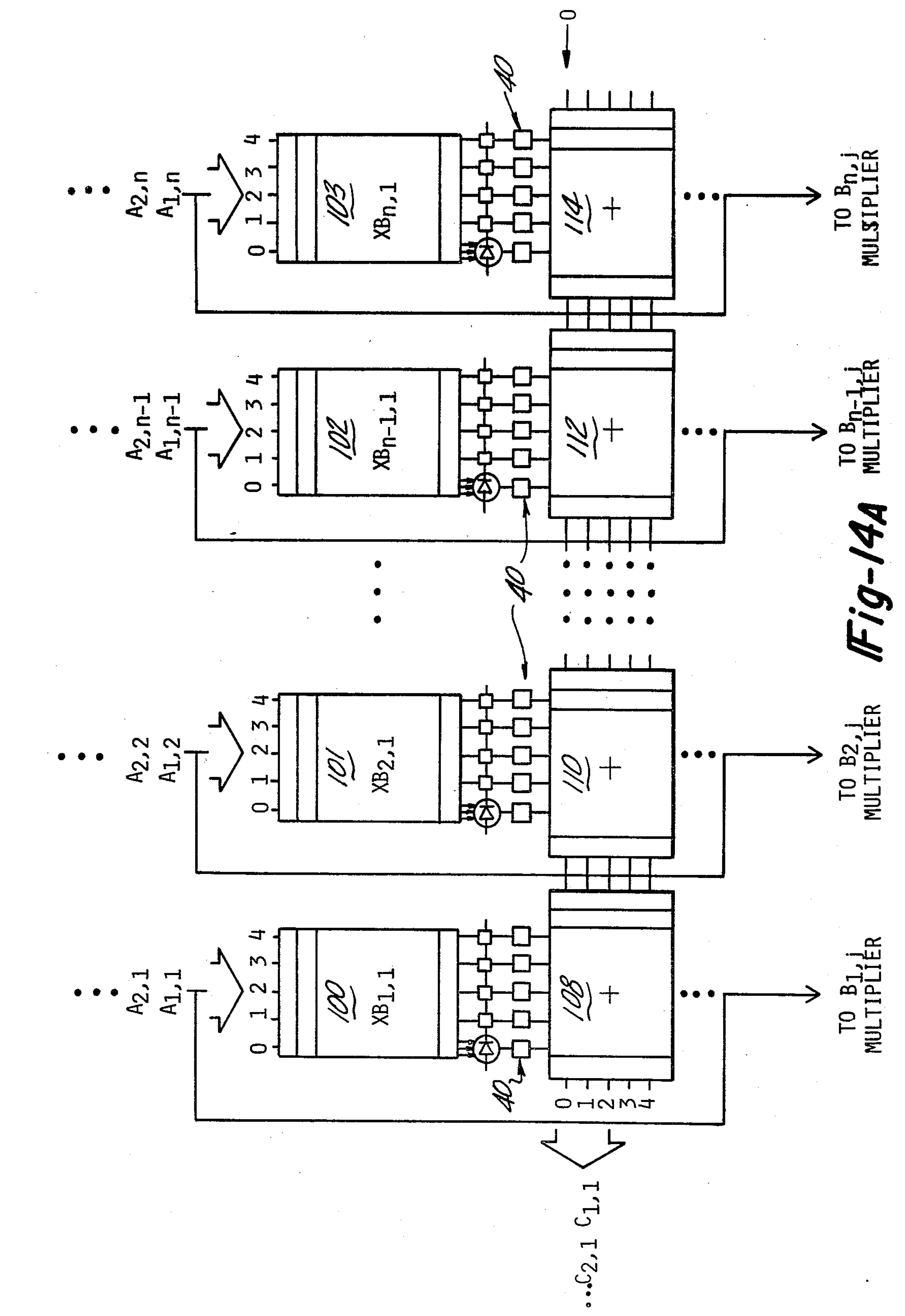
FIGS. 14A and 14B in conjunction are block diagrams showing the arrangement of a series of the modules of FIG. 10 interconnected to perform multiplication of matrices.
Figure 14B:
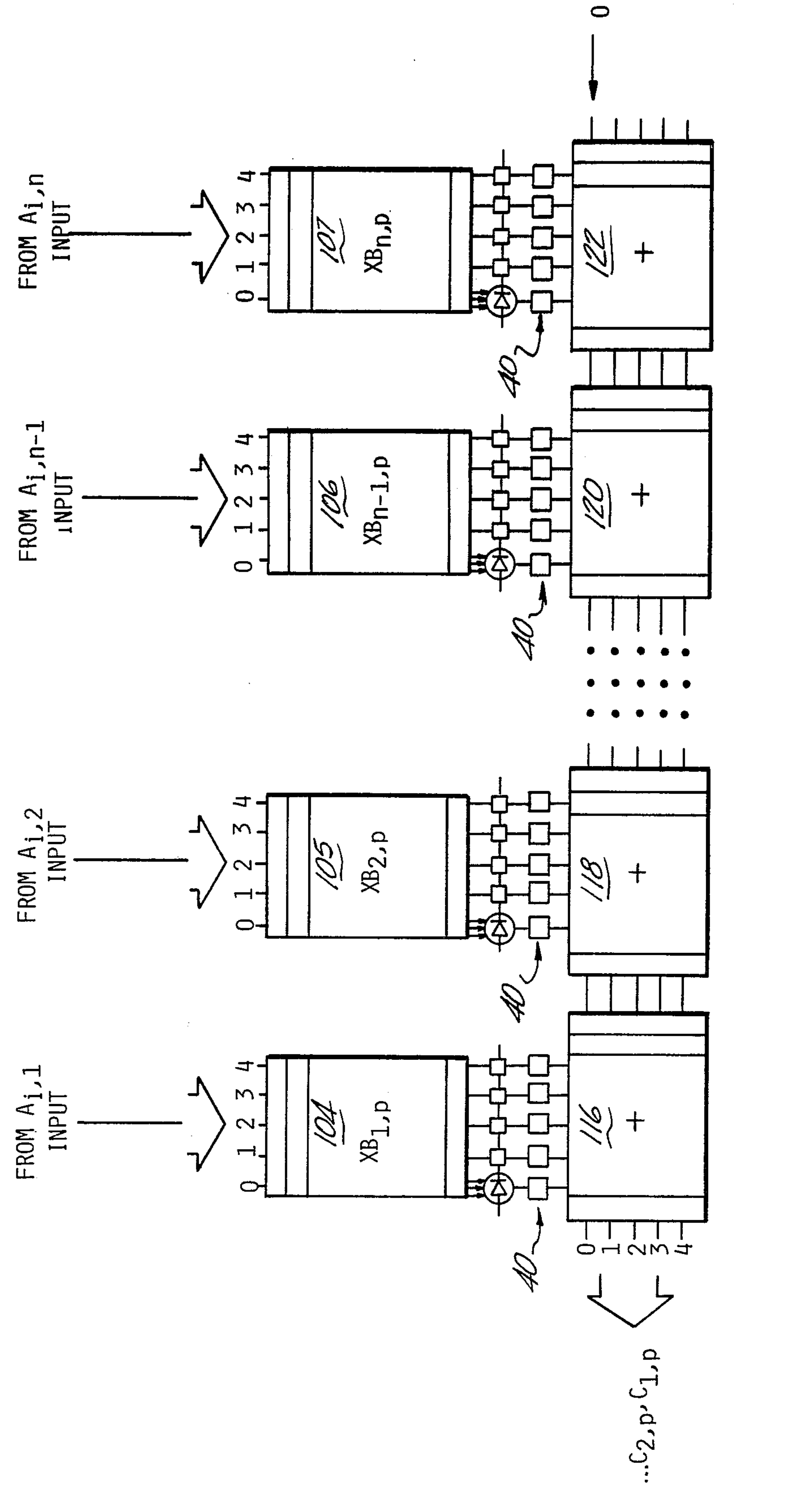

One of the most important applications of the numerical optical computer is the multiplication of matrices. This application can be extended to a number of transform operations such as DFT, Hadamard transforms and the like. For purposes of illustrating the application of the present computational module to matrix multiplication, reference is now made to FIGS. 14A and 14B wherein an interconnected arrangement of modules is depicted suitable for carrying out matrix multiplication for the general case of $[A]_{M\times N}[B]_{N\times P}=[C]_{M\times P}$. The coefficients of the master matrix $[B]_{N\times P}$ are stored in the modules 100–107 as multipliers. The values of the matrix $[A]_{M\times N}$ pass through the multiplier modules as light inputs to 100–106, row by row setting or "programming" the corresponding row of adder modules 108–114. Light pulses are entered into the first row of adder modules 108–114, providing in parallel the values of the first row of $[C_{1,1}]$ at the output of module 108. Simultaneously, $A_{1,1}$, $A_{1,2}$, . . . $A_{1,n}$ are multiplied by $B_{1,2}$, $B_{2,2}$, . . . $B_{n,2}$. In the second row of multipliers (not shown) and a second row of adders (not shown) adds the results to produce $C_{1,2}$. Thus the output $C_{1,p}$ from adder 116 occurs at the same time the other elements of matrix C's first row $[C_{1,j}]$ are being produced. The flip-flops 40 are then reset, ready for the entries of the next row of $[A]_{M\times N}$. The total computation time is equal to M+1 set-reset times of the modules and the number of computation modules required is 2NP. For example, to multiply two 10×10 matrices, the computation time would be about 30 nsec if we assume a module set-reset time of 3 nsec and the use of 200 computation modules for each modulus.

Figure 15:
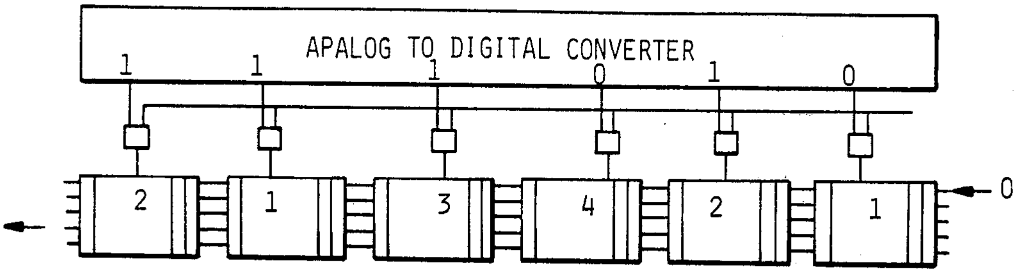
FIG. 15 is a block diagram of one arrangement for encoding data into the residue number system.

Before computation can be performed with the computation modules of the present invention, the input thereto must be encoded into its equivalent residue number in the appropriate spatial representation. One simple approach to encoding is to convert the analog input into an intermediate binary form by using a conventional analog to digital converter or, alternatively, by means of integrated optics scheme. The binary input can then be converted into residue numbers in the spatial form with the arrangement shown in FIG. 15. Note that for modulus 5, $$2^0=1,\ 2^1=2,\ 2^2=4,\ 2^3=3$$
$$2^4=1,\ 2^5=2,\ 2^6=4,\ 2^7=3$$

For example $$58_{10}=1\ 1\ 1\ 0\ 1\ 0_2$$

-continued $$|58|_5 = |1 \times (2^5) + 1 \times (2^4) + 1 \times (2^3) + 0 \times (2^2) + 1 \times (2^1) + 0 \times (2^0)|_5$$
$$= |1 \times 2 + 1 \times 1 + 1 \times 3 + 0 \times 4 + 1 \times 2 + 0 \times 1|_5$$
$$= |2 + 1 + 3 + 2|_5 = 3$$

Thus, it is apparent that encoding can be performed in one set time of a computation module.

Figure 16:
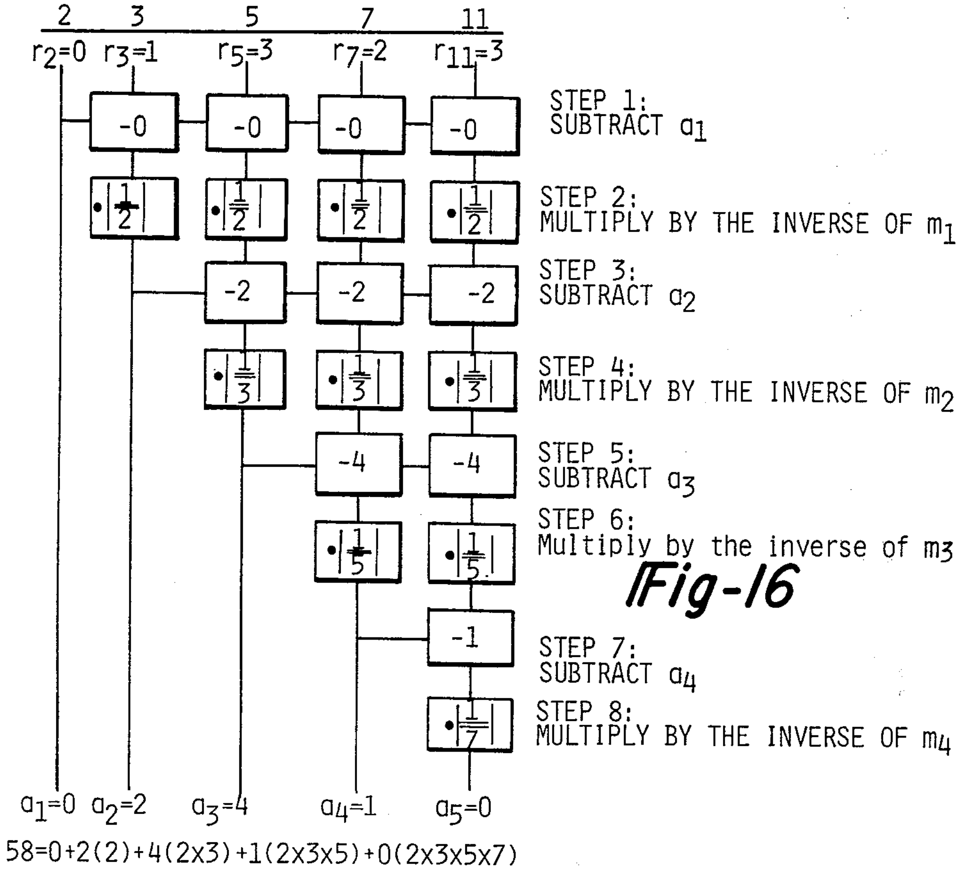
FIG. 16 is a block diagram of an arrangement for decoding residue numbers output by the computer system of the present invention.
Figure 17:
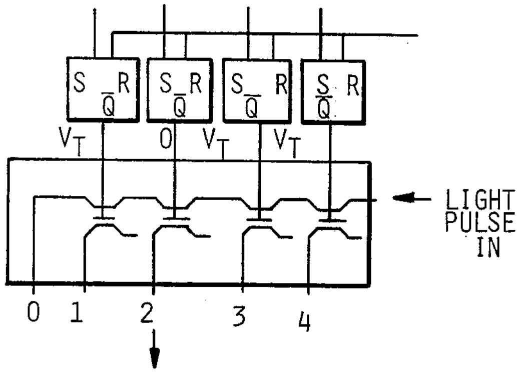
FIG. 17 is a schematic diagram of an optical data register.

Decoding a residue number is a more complicated operation than encoding. One suitable method of decoding consists of converting the residue number into the mixed radix system. The conversion method can be performed with the same type of hardware used for the basic residue arithmetic computations discussed above. The algorithm shown schematically in FIG. 16 may be employed for decoding a residue number for moduli 2, 3, 5, 7 and 11. $|1//K|_{m_i}$ represents the multiplicative inverse of the residue K in the modulus $m_i$ system, where $|K \times |1//K|_{m_i}|_m = 1$. For example, the inverse of 3 modulo 5 ($1//3_5$) is 2 because $|3 \times 2|_5 = 1$. To decode a number which has been encoded in a residue representation, a series of subtractions and divisions are performed on the residues, $r_{mi}$, which form the encoded number. The result is a set of coefficients, $a_i$, which, when multiplied by predetermined weighting factors, produce a decoded number. An example of this method is shown in FIG. 16 for moduli 2, 3, 5, 7 and 11. The number 58, which has been encoded, as described earlier, as 0, 1, 3, 2, 3 corresponding to $r_2$, $r_3$, $r_5$, $r_7$ and $r_{11}$, respectively, is decoded by first subtracting the first coefficient, $a_i$, from each residue $r_3$ through $r_{11}$ in the appropriate modulus. The resulting residue is then multiplied by the inverse of the first modulus, modulus 2. To illustrate, coefficient $a_3$ is found in FIG. 16 using the following modulus 5 calculations:

Step 1: $|r_5 - a_1|_5 = |3 - 0|_5 = 3$
Step 2: $|3 \cdot |1//2|_5|_5 = |3 \cdot 3|_5 = 4$
Step 3: $|4 - a_2|_5 = |4 - 2|_5 = 2$
Step 4: $|2 \cdot 1//3|_5|_5 = |2 \cdot 2|_5 = 4 = a_3$ This procedure requires N−1 sequential steps where N is the number of moduli used. Since encoding and 1 computation can be performed per one set-reset time of a module, this sequential decoding procedure would seemingly form a bottleneck for the entire decoding process. However, "bottlenecking" is avoided since the computation modules may be connected in a manner to perform pipeline processing. To pipeline the operation, the coefficients obtained earlier in the procedure are synchronously delayed such that all the coefficients advance through the decoding procedure at the same rate. This necessary delay can be accomplished by setting an adder for +K where K is the number to be stored temporarily. The number is recalled by sending a light pulse into the input port corresponding to 0. Alternatively, it can be achieved with the use of the simple data register module shown in FIG. 17. It is also to be noted that the multiplying factors $|1//m_i|m_j$ are fixed and can therefore be implemented by fixed maps.

Residue to mixed radix conversion is a very important procedure in residue arithmetic. Besides decoding the output, the conversion is used for other important operations such as sign detection, magnitude comparison, and overflow detection. Pipelining the procedure is therefore an important concept in an optical numerical computer using residue arithmetic. The original residue number may be stored in a cascade of data registers while it is being converted into the mixed radix form for condition check. The residue number is moved down at the same rate as the conversion process and the computation is continued after the checking is completed. Alternatively, after the residue numbers are converted into their mixed radix equivalent for sign detection or overflow detection, they can be converted back into the residue form for further computation. The inverse conversion (mixed radix to residue) can be achieved very easily, and once again in one set time of the computation module.

Overflow is a much more serious problem in residue arithmetic than in conventional arithmetic which utilizes a weighted number system. Not only is the residue for each individual modulus cyclic, the residue number system is also cyclic over its range M. The same representation is repeated for integers K, K+M, K+2M, etc. Overflow detection is not automatic as with weighted number systems and it is generally wise to avoid situations where overflow may occur. For some computations, this would require a periodic downscaling of the residue numbers. To do this, division operations would be necessary. As pointed out earlier, general division cannot be carried out easily and scaling by an arbitrary factor would not be practical. A residue number can be scaled however by a factor equal to the value of one of the moduli or a product of two or more moduli. For example, for a system with moduli 2, 3, 5, 7, a number X=191=[1, 2, 1, 2] would be scaled down by a factor of 7. Since the divisor 7 is also a modulus, the corresponding residue $X_7 = 2$ would be equal to the remainder when the number X is divided by 7. Therefore, $X - X_7$ is always exactly divisible by 7 and the homomorphic approach can be applied for the division operation. However, for modulus 7, the divisor is equal to 0 and division by 0 is not defined. The general approach is to proceed with the division while ignoring modulus 7. The residue of the quotient for modulus 7 is then obtained using the extension of base procedure. It is essentially a residue to mixed radix conversion. The entire scaling operation can be pipelined to maintain the throughput rate of 1 per one set-reset time of a computation module.

In view of the foregoing, it is apparent that the electro-optical computer and computational module described above not only provides for the reliable accomplishment of the object of the invention but does so in a particularly effective and economical manner. It may be appreciated that the computation module of the present invention allow the operand and operator to be combined in a single representation, without the need for data values to be recalled from storage, in as much as the stored value is entered into the module as an operator. Thus, the state of the module represents both the operand and the operation. The module therefore functions simultaneously as an adder and data storage device, thereby eliminating the need for a separate memory for values such as the coefficients of a reference function in correlation detection operations. Since the access time delay encountered when reading out stored values is eliminated, the inputs can be processed at a very rapid rate, especially for computations that are repeatedly performed.

It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

Having thus described the invention, what is claimed is:

1. A computation module for generating a function of two residues in the residue number system, comprising:

an array of light switches arranged in a plurality of rows, each of said light switches having a light receiving input and a light delivering output, first input means for inputting a light signal into one of said light switches in said first row thereof as a function of a first of said two residues, the last of said plurality of rows of light switches including output means for outputting a light signal from said module at a position which is a function of said two residues, a plurality of light transmission paths interconnecting said rows of light switches to define a plurality of light transmitting channels between said first input means and said output means, second input means for inputting electrical signals into said module as a function of the second of said two residues, and switching means responsive to said second input means for switching all the light switches in a particular one of said rows thereof determined by the identity of said second of said two residues, whereby said light signal is channeled through the array and is output from said output means at said position corresponding to the function of said two residues.

2. The module of claim 1, wherein said light switches in said rows thereof are arranged in a first, second, third and fourth group thereof for respectively performing first, second, third and fourth switching operations on said light signal, and said second input means comprises a first, second, third and fourth electrical input connected with said switching means.

3. The module of claim 2, wherein each of said light switches comprises an electrically switchable, optical wave guide coupler.

4. The module of claim 2, wherein the two residues are modulo M and said third group of rows of said light switches are arranged in M rows of N columns thereof.

5. The module of claim 2, wherein said switching means comprises a plurality of bi-stable electrical devices, at least one of said bi-stable devices being operably coupled with each row of said light switches, each of said bi-stable devices being operable to change its state in response to certain of said electrical signals input to said second input means.

6. The module of claim 2, wherein the output thereof represents the sum of the inputs thereto.

7. The module of claim 2, wherein the output thereof represents the difference of the inputs thereto.

8. The module of claim 2, wherein the output thereof represents the products of the inputs thereto.

9. A system for computing an arithmetical function for modulus M in the residue number system comprising:

a first programmable computation module including a plurality of rows of light switches each having a pair of light input means for receiving light into the corresponding light switch and a pair of light output means for delivering light from the corresponding switch, said rows being arranged in first, second, third and fourth groups thereof for performing first, second, third and fourth transform functions of a first set of two residues, a first set of M input means coupled with the light switches in the first row thereof for receiving into said module input light signals representing one of the two residues in said first set thereof in a predetermined spatially oriented form, a second set of M input means for receiving into said module input electrical signals representing the other of the two residues in said first set thereof in a predetermined spatially oriented form, switching means operably coupled with each of said light switches and with said second set of M input means for switching all the light switches in a particular one of said rows thereof determined by said other of the two residues, and a set of M output means coupled with certain of said light switches for delivering from said module output light signals representing a function of the two residues in said first set thereof in a predetermined spatially oriented form.

10. The system of claim 9, wherein each of said light switches comprises a radiant energy directional wave guide coupler.

11. The system of claim 10, wherein said wave guide coupler comprises a pair of optically coupled synchronous wave guides and said light switch further includes means for creating an electrical field across said optically coupled wave guides to unsynchronize said wave guides.

12. The system of claim 9, wherein one output of one of the light switches in the first row thereof is directly coupled with one of the inputs of a light switch in the last row thereof.

13. The system of claim 9, wherein the light switches in said one group of rows thereof are arranged in columns, one output of each of said last named light switches forming one input of a neighboring light switch in the same column, the other output of each of said last named light switches forming the other input to a light switch in a different column.

14. The system of claim 9, wherein said switching means comprises a plurality of bi-stable electrical switches, one associated with each row of said light switches and connected with all the light switches in the associated row whereby to cause each of the light switches in the associated row to assume the same switching state, in accordance with the state of the bi-stable electrical switch.

15. The system of claim 14, wherein said second set of M input means are each respectively operably coupled with the input of a corresponding one of said bi-stable electrical switches.

16. The system of claim 9, including a second programmable computation module comprising a plurality of rows of light switches each having a pair of light input means for receiving light into the corresponding light switch and a pair of light output means for delivering light from the corresponding light switch, said rows being arranged in first, second, third and fourth groups thereof for performing first, second, third and fourth transform functions of a second set of two residues, a first set of M input means coupled with the light switches in the first row thereof for receiving into said second module input light signals representing one of the residues in said second set thereof in a predetermined spatially oriented form, a second set of M input means coupled with said set of M output means of said first module for receiving input electrical signals representing said function of the two residues in said first set thereof output from said M output means of said first module and corresponding to the other of the residues in said second set thereof in a predetermined spatially oriented form, switching means operably coupled with each of said light switches in said second module for switching all of the light switches in a particular one of said rows thereof determined by said other of the residues in said second set thereof, a set of M output means coupled with certain of said light switches in said second module for delivering from said second module output light signals representing a function of the residues in said second set thereof in a predetermined spatially oriented form.

17. The system of claim 16, including a plurality of means, one associated with each of said second set of M input means to said second module and operably coupled with one of said M output means of said first module, for converting said output light signals to electrical signals.

18. The system of claim 17, wherein each of said signal converting means comprises a photo sensitive diode.

19. The system of claim 17, wherein said switching means of said second module comprises a plurality of bi-stable electrical switches respectively coupled between said second set of M input means of said second module and said plurality of means for converting said output light signals to electrical signals.

20. The system of claim 17, including means operably coupled with at least one of said first sets of M input means of said first and second modules adapted for encoding source data into an equivalent residue in a predetermined spatial representation.

21. The system of claim 20, wherein said encoding means comprises an analog to digital convertor.

22. The system of claim 20, including means coupled with said set of M output means of said second module for decoding said function of the residues of said first set thereof.

23. The system of claim 22, wherein said decoding means comprises a decoding module including a decoding module including a plurality of light switches optically connected with each other and adapted to be connected with a source of light pulses, said decoding module further including a plurality of switching inputs respectively operably coupled with said last named light switches and with said set of M output means of said second module for selectively controlling said light switches of said decoding module, said decoding module further including an M set of light output means for delivering decoded light pulses therefrom.

* * * * *